INVENTOR.
JAMES J. KINDELAN
ATTORNEY

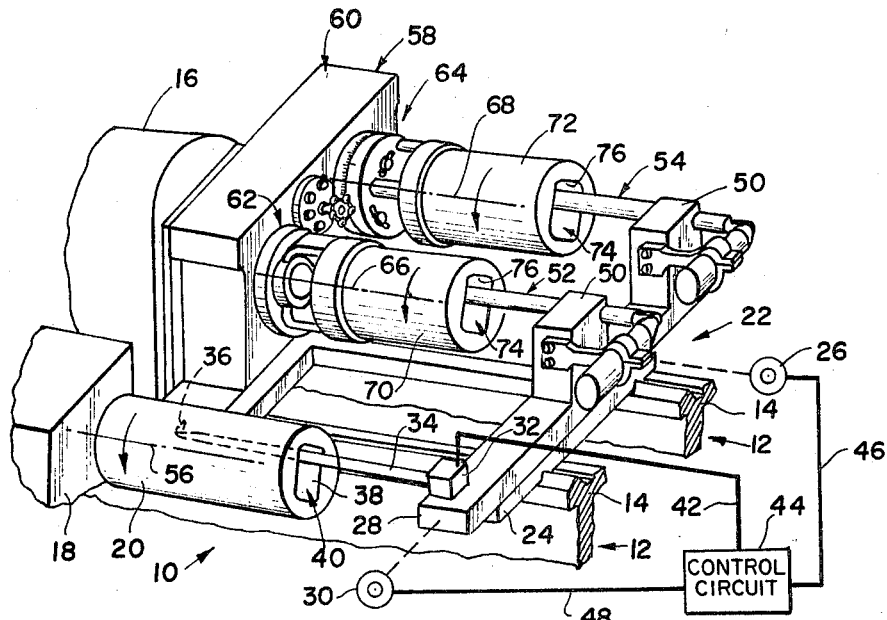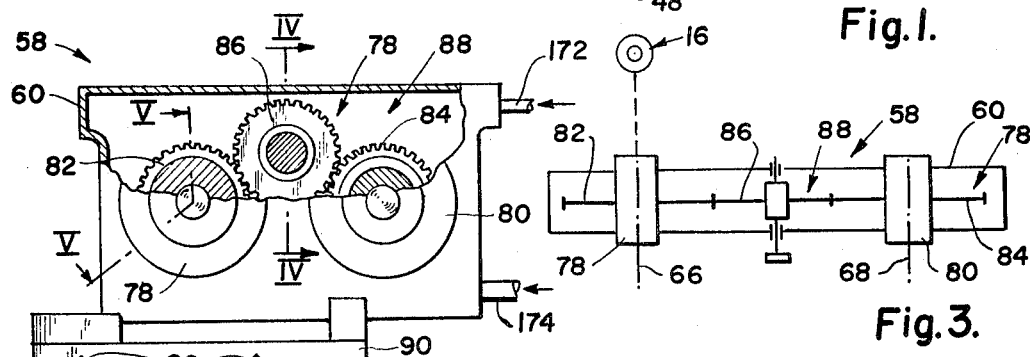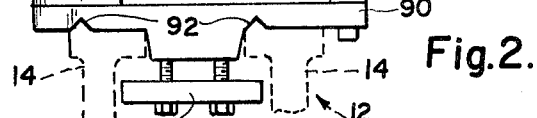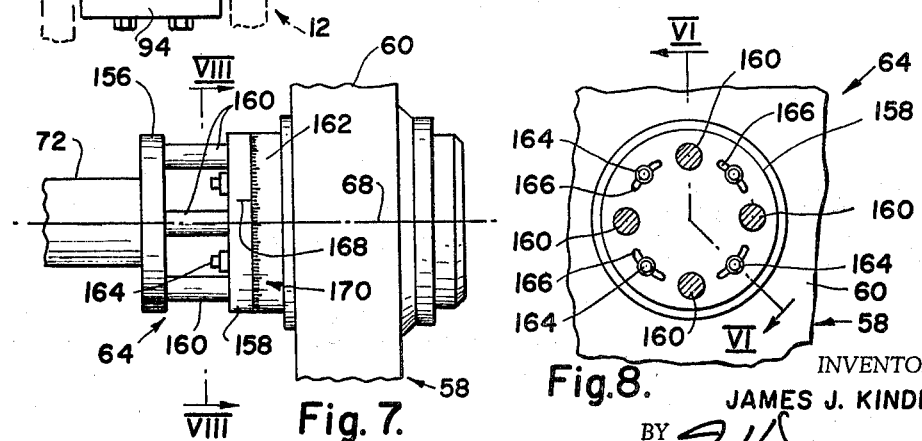

United States Patent Office 3,264,910
Patented August 9, 1966

3,264,910
MULTIPLE SPINDLE HEAD ASSEMBLY
James J. Kindelan, Greensburg, Pa., assignor to Overmyer Mould Company of Pennsylvania, Greensburg, Pa., a corporation of Pennsylvania
Filed May 22, 1964, Ser. No. 369,387
8 Claims. (Cl. 82—3)

The present invention relates to a multiple spindle head assembly adapted for mounting on the bed of a lathe and for connection with the driving spindle of said lathe. More particularly, the present invention relates to a multiple spindle head assembly which supports and drives a plurality of workpieces which may be machined simultaneously.

The present multiple spindle head assembly is adapted for use with apparatus, such as a conventional lathe, employed for machining hollow or solid workpieces. Although not limited thereto, the present multiple spindle head assembly is adapted for use with apparatus which may aptly be termed a design duplicator. Such apparatus normally comprise a conventional lathe equipped with the following essential elements: a carrier device movably supported on the lathe bed; a cutter element mounted on the carrier device and insertable into the cavity of the hollow die mold; a master die mold rotatably supported parallel with the hollow die mold and provided with a design on its interior surface which is to be machined on the interior surface of the hollow die mold; a tracer element supported on the carrier device and insertable into the cavity of the master mold in engagement with the interior surface of the master mold; first drive means for rotating the master mold and the hollow die mold in synchronism; second drive means for moving the carrier device incrementally toward the hollow mold die; third drive means for moving the carrier device transversely in the bed in a predetermined pattern; and control circuitry operatively connecting the tracer element to the second and third drive means for controlling the operation of the second and third drive means in response to the movement of the tracer element over the design in the master mold, whereby the cutter element is moved synchronously with the tracer element to duplicate the design in the hollow die mold by machining thereof.

The completed die molds are, for example, used in the manufacture of glassware. The glassware may have a distinctive shape and a simple or very intricate design. In any event, the cost of manufacturing the die molds is a large factor in the cost of the glassware. This is particularly true in modern glassware producing apparatus, since the mold dies are usable only for a short period of time. Thereafter, replacement molds must be purchased and installed in the glassware manufacturing apparatus.

Accordingly, the machining of a plurality of the hollow die molds in the above-described design duplicator apparatus would be a particularly desirable feature. For example, the cost of the completed die molds would be considerably reduced. Furthermore, the machinist would be required to set up the apparatus once for each multiplicity of die molds to be machined, rather than having to set up the apparatus for each individual die mold as is now the case.

Accordingly, the primary objects of the present invention include:

To provide a multiple spindle head assembly for supporting a plurality of workpieces in the position for simultaneous machining;

To provide a multiple spindle head assembly for supporting a plurality of workpieces which assembly is of compact design thereby using only a minor portion of the total length of the lathe bed;

To provide a multiple spindle head assembly of improved and simplified design;

To provide a multiple spindle head assembly having means for detachably securing the assembly to the lathe bed whereby the assembly may be removed from the lathe in the event the lathe is to be used for other purposes;

To provide a multiple spindle head assembly for supporting a plurality of workpieces including a driving train having disengagement means whereby one or all of the workpieces may be driven as desired; and To provide a multiple spindle head assembly for supporting a plurality of workpieces wherein the workpieces are rotatable with respect to one another whereby all of the workpieces may be oriented exactly one with the other.

In accordance with the invention, there is provided a multiple spindle head assembly comprising a relatively thin, closed casing having at least two spindles supported thereon for rotation about spaced parallel axis. Means is provided at the bottom of the casing for detachably securing the assembly to the bed of the conventional lathe. Means also is provided for connecting one of the spindles to the driving spindle of the lathe.

A driving train is provided which is housed within the casing and comprises a plurality of meshing gear members. Each of these spindles includes a gear member secured thereto. These gear members are essentially of equal pitched diameters. Cooperating with an adjacent pair of the spindles is a spur gear rotatably supported on the casing for rotation about an axis disposed parallel with the rotational axis of the spindles. The spur gear normally is in meshing relation with the gear members secured to the adjacent pair of the spindles. Hence, when one of the spindles is driven by means of the driving spindle lathe, the other spindle, connected thereto by means of the spur gear, will be driven at the same speed and in the same direction. The spur gear, however, is mounted on the casing, in a peculiar manner. Firstly, the spur gear is releasably mounted to the casing whereby it may be moved toward both of the gear members mounted on the adjacent pair of spindles, the arrangement being such that all backlash and subsequent wear occurring in the gear members mounted on the spindles may be eliminated. Secondly, the spur gear also is mounted for movement axially of its rotational axis from a first position to a second position, the arrangement being such that in the first position the spur gear will be engaged with both of the gear members connecting them in a driving relation, and in the second position the spur gear is disengaged from the gear members so that only one of the spindles may be driven.

The present multiple spindle head assembly is illustrated in the drawings accompanying this specification, as having only two spindles rotatably mounted thereon. It should be evident however that it is within the scope of the present invention that more than two spindles may be provided.

Each of the spindles is provided with a workpiece support member. The first workpiece support member is rigidly secured to the first spindle while the second workpiece support member is releasably secured to the second spindle, the arrangement being such that upon release of the second workpiece support member the workpiece secured thereto may be rotated about the rotational axis of the associated spindle so as to orient that workpiece with respect to the workpiece secured to the first spindle. This is a particularly desirable feature when the present multiple spindle head assembly is employed for supporting hollow die molds each of which has a mold cavity having a particular configuration. Prior to machining, the mold cavities must be oriented exactly with respect to one another.

The above and other objects and advantages of the present invention will become apparent from the following detailed description by reference to the accompanying drawings, in which:

FIGURE 1 is a fragmentary isometric view of a lathe adapted for duplicating designs from a master mold and equipped with the present multiple spindle head assembly;

FIG. 2 is an elevation view of the present multiple spindle head assembly with portions cut away to show details;

FIG. 3 is a view schematically illustrating a driving train of the present multiple spindle head assembly;

FIG. 7 is a fragmentary side view of the present assembly illustrating the workpiece support member secured to the second spindle; and FIG. 8 is a cross-sectional view, taken along the line 8—8 of FIG. 7, further illustrating the workpiece support member secured to the second spindle.

Figure 4:
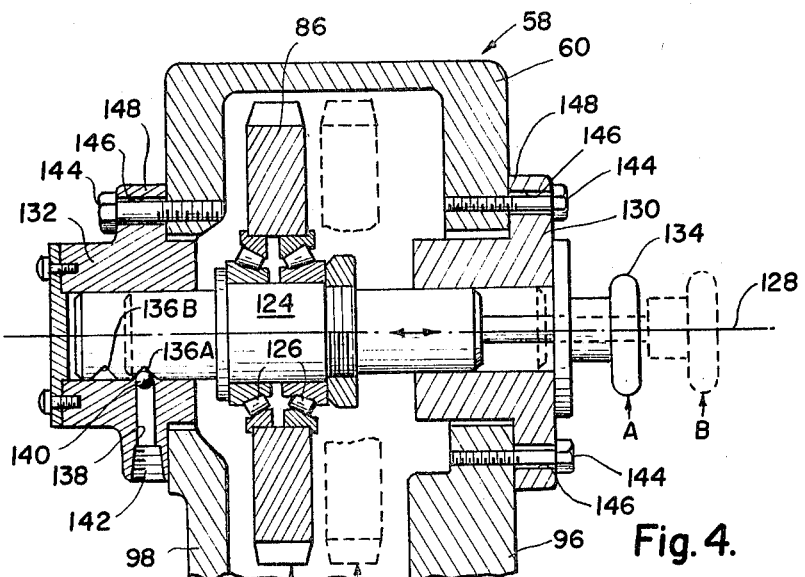
FIG. 4 is a cross-sectional view, taken along the line 4—4 of FIG. 2, illustrating a spur gear member and its supporting structure.

Reference is now directed to FIG. 1 wherein there is illustrated a lathe generally indicated by the numeral 10, having a conventional lathe bed 12 comprising a pair of spaced, parallel V-ways 14 and a primary powerhead 16 supporting a driving spindle (not shown in FIG. 1). The lathe 10 is adapted for use as a design duplicating apparatus as described above. The lathe 10 is provided with a secondary powerhead 18 on one side thereof to which is mounted a master mold 20. The secondary powerhead 18 rotates the master mold 20, for example, in the direction indicated by the arrow.

The lathe 10 also is provided with a carrier device 22 comprising a first plate or cross-slide 24 mounted on and guided by the V-ways 14 of the lathe bed 12 and driven along the lathe bed 12 toward and away from the primary powerhead 16 by means of a first carrier drive means schematically illustrated at 26. The carrier device 22 also includes a second plate 28 movably supported on the first plate 24 and driven transversely of the lathe bed 12 by means of a second carrier drive means schematically illustrated at 30. Supported at one end of the second plate 28 is a transducer 32 from which extends a follower bar 34 having a tracer pin 36 extending laterally from one end thereof. The tracer pin 36 is adapted for engagement with the interior surface 38 defining a mold cavity 40 in the master mold 20. A design (not shown) is provided in the interior surface 38 of the mold cavity 40, which design is to be reproduced in other mold dies, as will be described.

The transducer 32 serves to convert pressures applied to the tip of the tracer pin 36 into electrical signals, which signals are transmitted through conductor 42 to suitable control circuitry schematically illustrated at 44. As can be seen in FIG. 1, the first and second carrier drive means 26, 30 also are connected to the control circuit 44 by means of conductors 46, 48 respectively. The first and second carrier drive means 26, 30 receive intelligence from the control circuit 44 for controlling their operation thereby driving the carrier device 22 in a manner to be described.

Supported on the second plate 28 by means of suitable clamping blocks 50 are spaced, parallel cutter bars 52, 54. Each of the cutter bars 52, 54 preferably comprises the rotary cutter bar described and claimed in copending application Serial No. 369,389, filed May 22, 1964, and assigned to the assignee of the present invention. Alternatively, the cutter bars 52, 54 may comprise any suitable, presently available cutting element, such as a single point boring bar.

The master mold 20 is supported for rotation about an axis schematically illustrated by the dash-dot line numbered 56. The mold cavity 40 has a particular transverse configuration which in this instance is generally rectangular. The secondary powerhead 18 rotates the master mold 20 about the rotational axis 56 at a predetermined rotational speed. As the master mold 20 is rotated, the tracer pin 36 will be subjected to varying, horizontally directed pressures by the contours of the design. These pressures are translated into electrical signals by the transducer 32. The electrical signals are transmitted to the control circuit 44 which, in turn, controls the speed and direction of rotation of the second carrier drive means 30, the arrangement being such that the second plate 28 will be driven reciprocably and transversely of the lathe bed 12 in a pattern corresponding to the contours of the design lying in the path of the tracer pin 36. Since the cutter bars 52, 54 also are secured to the second plate 28, they will undergo a motion corresponding to the motion of the tracer pin 36. The first carrier drive means 26 moves the entire carrier device 22 incrementally toward the master mold 20 and the die molds 70, 72 during each revolution of the molds 20, 70 and 72.

As can be seen in FIG. 1, a multiple spindle head assembly 58 of the present invention is mounted on the lathe bed 12 adjacent to the powerhead 16. The multiple spindle head assembly 58 comprises a casing 60 from which extends a pair of workpiece support members 62, 64. The workpiece support members 62, 64 extend away from the powerhead 16 and parallel with the lathe bed 12. The workpiece support members 62, 64 are supported for rotation about spaced-apart, parallel axes 66, 68. The axes 66, 68 also are parallel to the rotational axis 56 of the master mold 20. As will be described, the workpiece support member 62 is connected to the powerhead 16 of the lathe 10 and is driven thereby. The workpiece support members 62, 64 are connected in driving relation so that they are driven simultaneously in the same direction and at the same speed. Furthermore, the powerhead 16 and the secondary powerhead 18 are connected and operate in synchronism whereby the workpiece support members 62, 64 and the master mold 20 are rotated in synchronism. Secured to the workpiece support members 62, 64 and extending in axial alignment with the axes 66, 68 are a pair of die molds 70, 72. Each of the die molds 70, 72 includes a mold cavity 74 defined by an interior surface 76. The mold cavity 74 is identical in configuration with the mold cavity 40 of the master mold 20. The design formed in the interior surface 38 of the master mold 20 is to be machined in the interior surfaces 76 of the die molds 70, 72.

As schematically illustrated in FIG. 3, the multiple spindle head assembly includes first and second spindles 78, 80 each of which is supported on the casing 60 for rotation about axes 66, 68 respectively. The first and second spindles 78, 80 include a gear member 82, 84 respectively. The gear members 82, 84 have identical pitched diameters. Disposed centrally of and above the gear members 82, 84 is a spur gear 86 which connects the gear member 82 of the first spindle 78 in driving relation with gear member 84 of the second spindle 80. The gear members 82, 84 and the spur gear 86 comprise a driving train 88. As will be described, the first spindle 78 is connected to the powerhead 16, schematically illustrated in FIG. 3, and is driven thereby. The arrangement of the driving train 88 is such that when the first spindle 78 is driven by the powerhead 16, the second spindle 80 will be driven at a corresponding speed and in a corresponding direction.

As can be seen in FIG. 2, a way plate 90 is secured to the bottom of the casing 60 and on one side thereof. The way plate 90 includes a pair of V-shaped grooves 92 corresponding to the V-ways 14 of the lathe bed 12. Releasably secured to the bottom of the way plate 90 is a clamping bar 94 which cooperates with the way plate 90 to clamp the multiple spindle head assembly 58 to the lathe bed 12. Hence, the way plate 90 and the clamping bar 94 comprise a detachable means for securing the multiple spindle head assembly 58 to the lathe bed 12.

Figure 5:
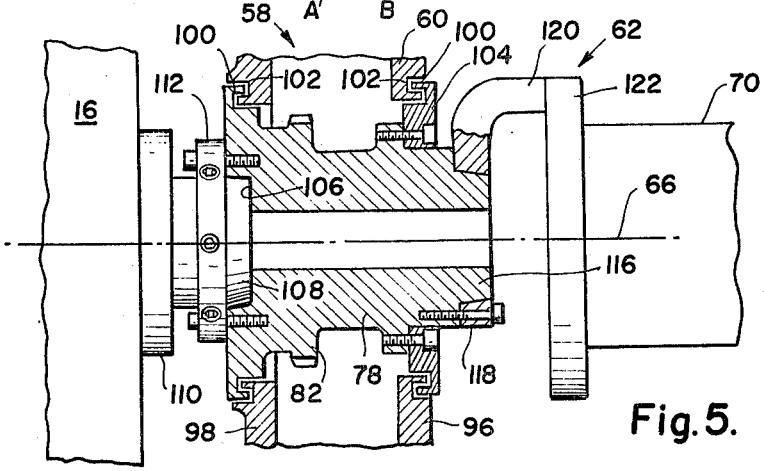
FIG. 5 is a cross-sectional view, taken along the line 5—5 of FIG. 2, illustrating a first spindle employed in the present assembly and its connection with the driving spindle of the lathe.

Referring now to FIGS. 2 and 5, the first spindle 78 extends through a pair of opposed, vertical wall members 96, 98 of the casing 60. The gear member 82 preferably is integrally formed with the first spindle 78 as illustrated in FIG. 5. The first spindle 78 has formed at one end thereof an annular rim 100 which is received in a correspondingly-shaped groove 102 formed in the wall member of the casing 60. A retainer plate 104 is secured to the opposite end of the first spindle 78 and includes an annular rim 100 which is received in a correspondingly-shaped groove 102 formed in the wall member 96 of the casing 60. The annular rims 100 and the correspondingly-shaped grooves 102 form labyrinth oil seals which prevent the loss of lubricating oil introduced into the casing 60.

In one end of the first spindle 78 there is formed a well 106 adapted to receive a hub 108 of a driving spindle 110 projecting from the powerhead 16. A retainer collar 112 is secured to the first spindle 78 and includes a plurality of fasteners, such as set screws 114, which serve to secure the first spindle 78 to the driving spindle 110 of the powerhead 16. It should be noted in FIG. 5 that the driving spindle 110 supports the first spindle 78 so that the first spindle 78 is spaced from, i.e., not engaged with, the wall members 96, 98 of the casing 60. Hence, the first spindle 78 is, in essence, a free floating member. With this construction, the first spindle 78 may be accurately aligned with the rotational axis of the driving spindle 110 which, as illustrated in FIG. 5, is coincident with the rotational axis 66 of the workpiece support member 62.

Referring still to FIG. 5, the opposite end of the first spindle 78 is provided with a hub 116. The workpiece support member 62 includes an annular ring 118 which fits over the hub 116 and is secured thereto. Extending radially and forwardly of the annular ring 118 is a pair of support arms 120 (only one visible in FIG. 5) to which is secured a face plate 122. The die mold 70 is rigidly mounted on the face plate 122. The face plate 122 is of conventional design and includes means (not shown) for positioning the die mold 70 in alignment with the rotational axis 66.

Referring now to FIG. 4, the spur gear 86 is rotatably supported on a shaft 124 by means of opposed bearing elements 126 for rotation about an axis indicated by the dash-dot line numbered 128. The rotational axis 128 is parallel with the rotational axes 66, 68 hereinbefore described. The shaft 124 is supported at each of its ends in flanged collars 130, 132 which are secured to the wall members 96, 98 respectively. A handle member 134 is secured to one end of the shaft 124 and projects therefrom away from the wall member 96.

It should be evident, then, that the spur gear 86, the shaft 124 and the handle member 134 comprise a unitary structure which is movable along the axis 128 by means of the handle member 134. As illustrated in FIG. 4, the spur gear 86 is positionable in that position shown in full line and indicated by the letter A, and in a second position illustrated in dotted outline and indicated by the letter B. In the position A, the spur gear 86 is in meshing relation with the gear members 82, 84, connecting the same in driving relation. The gear members 82, 84 may be disconnected simply by moving the spur gear 86 into the second position B. In order to prevent accidental movement of the spur gear 86 during operation of the multiple spindle head assembly 58, means is provided for locking the spur gear 86 in position A or in position B. The locking means comprises a pair of spaced-apart V-shaped grooves 136A and 136B which are formed in that end of the shaft 124 opposite the handle member 134. The flanged collar 132 is provided with a bore 138 which receives a ball member 140 engageable in one of the V-shaped grooves 136A, 136B and a set screw 142 for locking the ball member 140 in engagement with one of the V-shaped grooves 136A, 136B. As illustrated in FIG. 4, the ball member 140 is engaged in the V-shaped groove 136A thereby positioning the spur gear 86 in position A. Releasing the set screw 142, permits the ball member 140 to recede from the V-shaped groove 136A thereby permitting the spur gear 86 to be moved to position B. When spur gear 86 is positioned in position B, the V-shaped groove 136B is aligned with the bore 138. Thereafter the set screw 142 may be tightened so as to engage the ball member 140 in the V-shaped groove 136B.

As stated above, the spur gear 86 is movably mounted on the housing 60 for movement simultaneously toward the gear members 82, 84 so as to take up any wear occurring in the gear members 82, 84 and/or blacklash present in the driving train 78. To accomplish this, the flanged collars 130, 132 each are secured to the wall members 96, 98 respectively of the casing 60 by means of a plurality of fasteners 144 each of which extends through oversized openings 146 formed in the flange 148 of the collars 130, 132 and are threaded into the wall members 96, 98 respectively. It should be evident from inspection of FIG. 4, that loosening of the fasteners 144 will permit movement of the spur gear 86 downwardly and/or laterally of the position shown in FIG. 4. As can be seen in FIG. 2, should wear occur in the gear member 82 the spur gear 86 may be moved toward the gear member 82 to take up the wear while being maintained in proper meshing relation with the gear member 84. Since only a relatively small amount of wear will occur in either of the gear members 82, 84 or the spur gear 86 during the useful life of the multiple spindle head assembly 58, the distance through which the spur gear 86 may be moved is correspondingly small.

Figure 6:
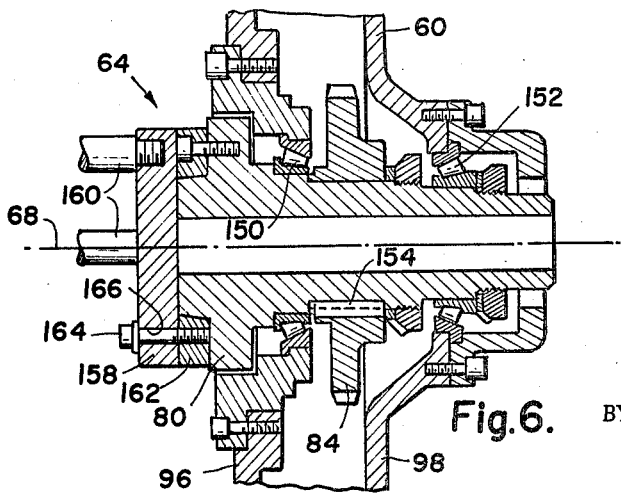
FIG. 6 is a cross-sectional view, taken along the line 8—8 of FIG. 7, illustrating a second spindle of the present assembly.

Referring now to FIGS. 2 and 6, the second spindle 80 also extends through the wall members 96, 98 of the casing 60. However, the second spindle 80 is journaled to the wall members 96, 98 by means of bearings 150, 152. Hence, the second spindle 80 is maintained in a fixed position with respect to the housing 60 and is rotatable about the axis 68. The gear member 84 is positioned on the second spindle 80 and is secured thereto for rotation therewith by an suitable means such as a conventional key 154.

Referring now to FIGS. 6, 7 and 8, the workpiece support member 64 is shown comprising a face plate 156 (FIG. 7) to which is mounted the second die mold 72. The face plate 156 is of conventional design and includes means (not shown) by which the die mold 72 may be aligned with the rotational axis 68.

As stated above, the workpiece support member 64 supports the die mold 72 for angular movement about the axis 68 relative to the die mold 70 which is rigidly secured to the workpiece support member 62. This angular movement is required in order to orient the mold cavity 74 of the die mold 72 exactly with respect to mold cavity 74 of the die mold 70 (see FIG. 1). To accomplish this, the face plate 156 is supported on a first alignment plate 158 by means of a plurality of horizontally extending posts 160. The first alignment plate 158 is, in turn, releasably secured to a second alignment plate 162 by means of a plurality of fasteners 164. Each of the fasteners 164 extends through an arcuate slot 166 formed in the first alignment plate 158 and is threadedly engaged in the second alignment plate 162. The arcuate slots 166 are equidistantly spaced from the center of the first alignment plate 158 and form arc segments of a circle. Hence, loosening of the fasteners 164 permits rotation of the first alignment plate 158 with respect to the second alignment plate 162.

As an aid for accurately aligning the mold cavity 74 of the die mold 72 with respect to the mold cavity 74 of the die mold 70, the first alignment plate 158 is provided with an indexing mark 168 while the second alignment plate is provided with a scale 170 which is disposed completely around the periphery thereof. The scale 170 is divided into 360 angular degrees. During the setup of the apparatus illustrated in FIG. 1, the mold cavities 74 of the die molds 70, 72 are aligned initially by eye. Thereafter, any suitable device such as an optical instrument may be used to determine the exact angular displacement of the mold cavities 74. Consequently, the first alignment plate 158 may be rotated in the appropriate direction through the predetermined angular displacement. The required displacement will, of course, be measured by means of the index mark 168 and the scale 170.

As can be seen in FIG. 2, the casing 60 is provided with an oil inlet pipe 172 adjacent to the top thereof and an oil outlet pipe 174 adjacent to the bottom thereof. A lubricating oil is introduced through the pipe 172 and withdrawn from the pipe 174. The driving train 88 preferably is immersed at all times in a bath of oil. The oil may be supplied, for example, by the same pump (not shown) which supplies the primary and secondary powerheads 16, 18.

Although the invention has been shown in connection with one specific embodiment, it will be readily apparent to those skilled in the are that various changes in form and arrangement of parts may be made to suit requirements without departing from the spirit and scope of the invention.

I claim as my invention:

1. A thin, compact spindle head assembly adapted for mounting on a bed of a lathe adjacent to the driving spindle of said lathe, comprising in combination: a casing extending transversely of said bed; means for detachably securing said casing to said bed; a plurality of spaced-apart spindles extending through said casing and supported thereon for rotation about spaced, parallel axes extending parallel with said bed; support members, one each secured to the adjacent ends of each of said spindles, each of said support members supporting a workpiece in axially-aligned relation with the axis of rotation of the spindle carrying the same; means for connecting one of said spindles to said driving spindle of said lathe; and a driving train disposed within said casing for connecting all of said spindles in driving relation with one another, said driving train comprising a plurality of meshing gear members aligned along a common plane.

2. A dual spindle head adapted for mounting on a bed of a lathe adjacent to a driving spindle of said lathe, comprising in combination: a casing extending transversely of said lathe bed; means for securing said casing to said lathe bed; a first spindle supported on said casing for rotation about a first axis; a second spindle supported on said casing for rotation about a second axis which is spaced from said first axis; one of said axes being coincident with the rotational axes of said driving spindle; a driving train disposed within said casing and connecting said first spindle in driving relation with said second spindle, said driving train comprising a plurality of meshing gear members aligned along a common vertical plane; support members, one each secured to the adjacent ends of said first spindle and said second spindle for supporting a pair of workpieces axially-aligned with said first and second axes; and means connecting one of said spindles with said driving spindle of said lathe for driving said first and second spindles simultaneously at the same speed.

3. The combination of claim 2 wherein said driving train comprises a first gear member secured to said first spindle, a second gear member secured to said second spindle and having a pitch diameter equal to said first gear member, and a spur gear engageable with both said first and second gear members.

4. The combination of claim 3 including means supporting said spur gear for reciprocal movement in a direction parallel with said first and second axes, between a first position wherein said spur gear is engaged with said first and second gear members and a second position wherein said spur gear is disengaged from said first and second gear members.

5. The combination of claim 4 wherein said support means for said spur gear is movably supported whereby said spur gear may be moved toward said first and second gear members to take up looseness caused by wear in said first and second gear members.

6. The combination of claim 1 wherein said support members comprise mounting plates extending transversely of said first and second axes of said spindles and having corresponding faces to which said workpieces are secured, means for rigidly securing a first of said mounting plates to said first spindle; and releasable means for securing a second of said mounting plates to said second spindle, said second of said mounting plates being rotatable about said second axis whereby the workpiece carried thereby may be oriented with respect to the workpiece carried by said first of said mounting plates.

7. A thin, compact dual spindle head for rotatably supporting a pair of workpieces whereby said workpieces may be machined simultaneously, said dual spindle head being adapted for mounting on a bed of a lathe and adjacent to the driving spindle of said lathe, said dual spindle head comprising in combination: a casing having a pair of opposed, vertical walls extending transversely of said lathe bed; means for detachably securing said casing to said lathe bed; a first spindle supported on said vertical walls for rotation about a first axis coincident with the rotational axis of said driving spindle; a second spindle supported on said vertical walls for rotation about a second axis which is spaced from said first axis; a driving train disposed between said vertical walls for connecting said first spindle in driving relation with said second spindle, said driving train comprising a pair of gear members, one each secured to each of said first and second spindles, and a spur gear supported on said vertical walls in meshing relation with the gear members of said first and second spindles; means supporting said spur gear for movement toward said gear members; a support member secured to each of said first and second spindles and rotatable therewith, each said support member supporting a workpiece aligned with the axis of rotation of the spindle to which it is mounted; one of said support members comprising a pair of plates releasably secured together and rotatable relative to one another whereby the workpiece carried thereby may be oriented with respect to the workpiece carried by the other said spindle; and means connecting said first spindle with said driving spindle.

8. In apparatus for machining the interior surfaces of a pair of die molds simultaneously, said apparatus having a master mold supported laterally thereof and including a design on an interior surface thereof, means for rotating said master mold at a predetermined speed, a bed, a supporting assembly movably mounted on said bed, a follower device extending from said assembly into the interior of said master mold, said follower device having a tracer pin engageable with said interior surface of said master mold, a pair of cutter bars supported on said assembly and each extending into the interior of one of said die molds, means for moving said assembly axially along said bed and transversely thereof in response to the movement of said tracer pin as said tracer pin moves along said design formed in said interior surface of said master mold, a driving spindle above said bed, and the improvement in means for supporting said pair of die molds, comprising: a casing extending transversely of said bed and adjacent to said driving spindle; means for detachably securing said casing to said bed; a first spindle supported on said casing for rotation about an axis which is coincident with the rotational axis of said driving spindle; means for connecting said first spindle to said driving spindle; a second spindle supported on said casing for rotation about a second axis which is laterally spaced from the axis of said first spindle, said second spindle being disposed laterally of said bed away from said master mold; support members, one each secured to the adjacent ends of each of said first spindle and said second spindle, said support members supporting said workpieces in axial alignment with the axis of rotation of said first spindle and said second spindle; and a driving train disposed within said casing for connecting said first spindle in driving relation with said second spindle whereby said pair of die molds are rotated simultaneously at the identical speed, said driving train comprising a plurality of meshing gear members, a first gear member secured to said first spindle, a second gear member secured to said second spindle and a spur gear member meshing with said first spindle and said second spindle.

No references cited.

WILLIAM W. DYER, Jr., *Primary Examiner.*

HARRISON L. HINSON, *Examiner.*